3,065,047
RECOVERY OF TUNGSTEN FROM BRINE
Warren E. Clifford, San Francisco, Calif., assignor, by mesne assignments, to American Potash & Chemical Corporation, a corporation of Delaware
No Drawing. Filed Dec. 8, 1960, Ser. No. 74,495
15 Claims. (Cl. 23—22)

This invention relates in general to the process for recovering tungsten from solutions containing the same, and more particularly to the recovery of tungsten values from highly alkaline solutions.

Customarily, tungsten has been precipitated from solutions which have been acidified to at least the point of neutrality by the use of "oxine" or, as it is more properly known, 8-quinolinol. When used in this fashion, oxine in the amount of 2 moles for each mole of tungsten forms a neutral compound which precipitates and thereafter may be treated so as to separate the pure tungsten therefrom.

However, tungsten is an ingredient normally found in certain highly alkaline materials such as Searles Lake brine, a material prepared from natural salt deposits which is of value primarily for the borax and potash values therein, and to a lesser extent for the sulfates and carbonates. It has long been desired to remove tungsten values present in the brine tail solutions, those from which the carbonates, potash and borax values have been recovered, but this has not been feasible as it is not possible economically to reduce the pH of these materials, which may be in the vicinity of eleven or more, to the seven or less necessary for the use of known tungsten recovery procedures.

It is therefore an object of this invention to provide a method whereby tungsten may be precipitated from highly alkaline solutions.

It is further the object of this invention to provide a process for the recovery of tungsten in substantially pure form, which process involves the treatment of highly alkaline solutions and obviates the necessity for reducing the pH of these materials to within an acid range.

Further objects and advantages of this invention, if not specifically set forth, will become apparent during the course of the discussion which follows.

Broadly, it has been found that tungsten which is dissolved in brine or highly alkaline solutions may be recovered therefrom by adjusting the pH of the solutions to within the range of about 8 to about 10, and thereafter adding thereto oxine, or certain water insoluble substitution products thereof, in a molar ratio of 1 mole oxine material to each mole of tungsten material, whereby to form a tungsten-oxine precipitate from which the tungsten readily may be separated. The process thus involves the treatment of highly alkaline materials with only a single mole of oxine for each mole of tungsten present in the solution.

More particularly, a solution of natural salt material (which may or may not be pretreated to remove a portion of the salt therein) such as Searles Lake brine tail solution, is first acidified to within the range of about 8–10. A preferred range for oxine is 8.6–9.3 and for 5,7-dichloro-oxine 9–9.7. As can be seen from the table below, a pH of no greater than 9.8 is essential when using oxine, though use of 5,7-dichloro-oxine enables use of a pH as high as 10. At levels less than about 8.0, the precipitation step which follows acidification becomes less effective and accordingly 8.0 may be set as the practical lower limit. The pH adjustment may be effected by the use of any suitable acid, organic or inorganic material, concentrated $H_2SO_4$ or $CO_2$ being preferred for reasons of cost.

Recommended, but not entirely essential, is the removal of the alkali salts which form at this point due to the addition of the acid material. As the pH is lowered, $CO_3^=$ is converted to $HCO_3^-$ and $NaHCO_3$ precipitates out of the brine. The quantity of salt formed may vary somewhat with the time of agitation, but in tests which have been run in the process, 70 g. per liter (using Searles Lake brine tail solution) forms on a dry weight basis. It is to be understood that this precipitate is not necessarily $NaHCO_3$, but it is believed to be composed largely of this material. In laboratory tests, 30 minutes' agitation is sufficient to precipitate almost all of the salt which will come out at a given pH. This time, of course, may vary somewhat depending on the particular material treated. As stated above, it is preferred that the solid precipitate be removed at this point as this simplifies the purification of the tungsten material which precipitates following the next step.

Next, 8-quinolinol, or a halogen-substituted 8-quinolinol, hereinafter referred to as an oxine material, such as 5,7-dichloro-oxine, 5,7-dibromo-oxine or 7-iodo-oxine, is added to the solution alone or in admixture with a carrier therefor, such as dilute $H_2SO_4$ or G.E. "Antifoam 60." The derivative 5,7-dichloro-oxine shows marked superiority from the standpoint of precipitant losses to the brine and effectiveness of precipitation at higher temperatures and pH values than the temperature and pH used for oxine precipitation. However, 5,7-dichloro-oxine is far more expensive than oxine itself, and this holds true for the other oxine derivatives listed above.

As stated earlier, equal molar quantities of oxine material to tungsten may be used but it is desirable to use a slight excess of oxine material so as to ensure complete precipitation of the $WO_3$ values.

The table below sets forth the results of various tests using oxine at successively decreasing pH levels and shows the quantity of tungsten precipitated and that remaining in the tailings.

TABLE I

*Precipitation of $WO_3$ With .03 M Oxine as a Function of pH*

| $H_2SO_4$, ml./l. | pH | $WO_3$, g./l., tails | Percent $WO_3$ Precipitated |
|---|---|---|---|
| 0 | 11.3 | 2.68 | 0 |
| 20 | 10.2 | 2.66 | 0 |
| 30 | 9.8 | .94 | 65 |
| 40 | 9.3 | .14 | 95 |
| 50 | 8.6 | .095 | 96 |
| 60 | 8.1 | .24 | 91 |

As stated before, it is desirable that a slight excess of oxine on a mole to mole basis be present.

Table II below shows the precipitation of .012 M $WO_3$ from Searles Lake brine (neutralized to pH 9.3 and filtered) as a function of oxine concentration.

TABLE II

*Precipitation of $WO_3$ by Oxine as a Function of Initial Oxine Concentration*

| Oxine, Moles/l. | $WO_3$, g./l. tails | Percent $WO_3$ Precipitated |
|---|---|---|
| .01 | .7 | 74 |
| .012 | .5 | 82 |
| .015 | .15 | 94 |

The oxine losses to the brine run 10–15 percent on a mole basis of the recovered tungsten, irrespective of the concentration used. Where a lower concentration of oxine is employed, somewhat less is lost; but also less tungsten is recovered. Since a lower percentage of tungsten recovery means more brine must be treated, thereby increasing equipment and neutralization costs, the use of a slight molar excess, 1.5 moles oxine for each 1.2 moles of tungsten values expressed as (1.25:1) $WO_3$, appears optimum.

Temperatures of from 20° C. to 90° C. may be used for the precipitation of the tungsten, using various precipitating agents. Temperatures near the top of this range are not recommended for oxine as such higher temperatures reduce the recovery efficiency due to the fact that the tungsten precipitate ($NaWO_3Ox$) has a normal temperature dependent solubility. Thus, a lesser quantity precipitates out at a higher temperature. However, when 5,7-dichloro-oxine is used, the operating temperature may be raised to as high as 90° C. without adversely affecting the recovery efficiency since the solubility of the tungsten precipitate ($NaWO_3OxCl_2$) remains low at higher temperatures. On the other hand, there is an advantage in operating with the 5,7-dichloro-oxine at higher temperatures, since the reaction rate increases with higher temperatures.

The effectiveness of the precipitation from brine is due to the high concentration of sodium (or potassium ions) in the alkaline solution, driving to the right the reaction $$Na^+ + WO_3Ox^- \rightarrow NaWO_3Ox$$

Ox representing the oxinate ion.

The oxine material is added to the brine and the batch is agitated for a period of at least about 15 minutes to cause a precipitate to form. When the operation is carried out on a large scale, reaction periods (during which precipitation takes place) may continue for as long as 24 hours. Under optimum reaction conditions using crude dichloro-oxine, a period of about two hours or less would be sufficient.

In the next step, the tungsten-oxine precipitate is removed by filtration from the solution. For optimum economics this filtration is carried out at the reaction temperature.

Where the tungsten is being removed from naturally-occurring salt mixtures, other inorganic salts will be co-precipitated at the time of the formation of the tungsten-oxine precipitate. In order to remove the co-precipitated inorganic salts from the filter cake, the cake is repulped with dilute sulfuric acid, e.g. ⅛ M sulfuric acid, and refiltered. The optimum ratio of wet, crude cake to acid, in the case of the material designated "Carbonated Mother Liquor No. 2," derived from Searles Lake brine, was found to be 0.8 to 1.0 gallon to each pound of wet, crude cake. In any event, the pH of the repulped slurry should be reduced to a value of between about 2 and 4. If, as suggested earlier, dilute $H_2SO_4$ is added with the oxine to the solution under treatment, the repulping step may be unnecessary.

Thereafter, the partially purified tungsten-oxine precipitate must be treated to separate the tungsten and the oxine as well as to remove any other impurities which may be present.

Either of two methods may be used to perform this step. An organic solvent for the oxine, such as methyl isobutyl ketone or chloroform, is used. Methyl isobutyl ketone is preferred. Any other water immiscible solvent such as benzene or various ethers which dissolve oxine may be selected. A base is also added, preferably ammonium hydroxide or sodium hydroxide, either or both in relatively small quantities. Recommended is a 4 weight percent $NH_3$ solution. Other base materials may serve, such as $Ca(OH_2)$, $KOH$ or $LiOH$. It is necessary to add each of these materials only until the oxine has dissolved in the organic material and the $WO_3$ has totally dissolved in the aqueous phase. Moderate, slow heating may be required. The amount of base necessary to combine with the $WO_3$ can be readily calculated, based upon the quantity of $WO_3Ox^-$ present initially. The sodium or ammonium ion first combines on a one to one molar ratio with the tungsten-oxine precipitate, which, in the presence of $OH^-$ ions, decomposes to free HOx, which may then be removed in the organic solvent. When a pH maximum of about 10 is observed, the reaction proceeds according to the following equation:

$$NaWO_3Ox + OH^- \rightarrow Na^+ + WO_4^= + HOx$$
$$HOx\ (aq.) \rightarrow HOx\ (org.)$$

Obviously, it is desirable to recover in a form suitable for recycling the oxine split from the tungsten and to accomplish this the oxine solution is acidified, whereby to cause the oxine to strip from the organic solution into the aqueous acid solution, according to the reaction $$HOx\ (org.) + H^+\ (aq.) \rightarrow H_2Ox^+\ (aq.)$$

A relatively dilute solution of $H_2SO_4$ is effective. In commercial operations, it is probable that the final oxine concentration in the aqueous phase will be no more than about one mole and, under such circumstances, a 1 M $H_2SO_4$ solution strips better than 99% of the oxine from the organic solution.

The tungsten values can be recovered from the basic solution produced by treatment with a base and an organic material by acidifying the solution and precipitating the tungstic acid which is then filtered out. Treatment of the brine formed by the addition of the base to the precipitate aforementioned by 5 percent concentrated acid by volume is effective. Paper pulp and/or cinchonine may be added to help bring down the tungstic acid. A number of alternative approaches are possible here as a number of ways are known to the art for precipitating tungsten from acid solutions.

Where it is desirable to eliminate the necessity for precipitating the tungstic acid from a solution, an alternative method is available. Following the afore-mentioned step wherein a tungsten-oxine precipitate is formed by the addition of oxine to the initial brine, the precipitate is treated with dilute acid so as to remove any remaining salt impurities. This leaves the tungsten-oxine precipitate in an acid form which is water insoluble. The reaction proceeds as follows:

$$NaWO_3Ox + H^+ \rightarrow HWO_3Ox\ (water\ insoluble) + Na^+$$

The amount of acid required to remove the salt impurities is small, 3–4 percent concentrated $H_2SO_4$, based upon the amount of brine present. The acid may be used in a dilute form, but fairly concentrated acids may be used since initially sodium bicarbonate is present to neutralize it.

The next step in this alternative process is to add ammonium hydroxide to decompose the acid form tungsten-oxine compound. Small amounts of the ammonium hydroxide may be used, the actual quantities being calculated as aforementioned, based upon the amount of tungsten-oxine precipitate. One to one molar ratios of ammonium hydroxide to tungsten-oxine are used. For example, in the treatment of Searles Lake brine aforementioned, one volume of base to ten volumes of treated brine, using .15 M $NH_4OH$, was adequate. Also present, as in the aforementioned purification step, is the organic solvent used to dissolve the oxine liberated by the break-up of the tungsten-oxine precipitate. The oxine may be stripped from the solvent as previously set out. The advantage to the use of ammonium hydroxide lies in the fact that the ammonium hydroxide may be readily evaporated from the $WO_3$. Preferably the $WO_3$ is thereafter roasted at at least 750° C. to remove any organic impurities which may find their way into the tungsten values from the use of organic solvent or present initially in the brine. Temperatures of 500° C. have been found to be inadequate. It is noted that an additional 26% of the weight is lost at temperatures of 1000° C. A product formed at 1000° C. has been shown to be about 99% $WO_3$.

A method for splitting the tungsten-oxine complex, purifying the ammoniacal tungsten solution formed, filtering and concentrating the purified ammoniacal tungsten solution and converting the concentrated tungstates to tungstic acid which may be applied to larger scale operations is set forth below.

The aqueous ammoniacal solution (which may contain quantities of an emulsion) obtained earlier is treated with a suitable agent, e.g. chlorine, to oxidize all of the trivalent arsenic present in the layer. The addition of the chlorine renders the aqueous material slightly acidic and may require neutralization to a pH of about 7 before proceeding with the purification. Additional ammonium hydroxide (concentrated) may be used until the proper neutrality is obtained and additional concentrated ammonium hydroxide is added to render the solution strongly basic. A magnesium reagent is added. The mixture is then chilled with agitation to about 30° F. and held for a minimum of 6 hours at this temperature to precipitate the arsenic and phosphorus as magnesium salts. As an alternative purification method, attention is directed to the Kasey patent, 2,801,152.

Where the purification procedure outlined above is selected, the ammoniacal solution is then filtered to yield a solution high in tungsten values and the filter cake is washed with 10% (by weight) $NH_3$ solution so as to remove all tungsten material. The ammonia is then recovered from the solution through any suitable method. Preferably, a concentration factor of at least 1.7 is observed to yield a concentrated tungstate solution.

Next, a suitable reactor, preferably glass-lined, is charged with an amount of concentrated sulfuric acid equal to 10% of the volume of the concentrated tungstate liquor. In addition, concentrated nitric acid equal to 10% of the volume of sulfuric acid is charged into the reactor to assure that the tungsten remains at its highest state of oxidation. The concentrated acid mixture is then heated to about 270° F. and the concentrated tungstate solution dripped into the hot, agitated acid. If the mixture acquires a greenish color, additional nitric acid is added. Following addition of all the tungstate solution, the mixture so formed is boiled to remove a portion of the water, thus to prevent the formation of a hydrated tungstic acid, which, it has been found, is almost colloidal in size and very difficult to filter. When the foregoing steps have been completed, the tungstic acid slurry is filtered at a temperature of about 100–175° F. to yield a solid phase tungstic acid. Since water peptizes the $H_2WO_4$, a dilute nitric acid wash is recommended for the filter cake. A 5–10% nitric acid solution is satisfactory.

Preferred embodiments of the process are set forth below by way of illustration.

EXAMPLE I

A batch of Searles Lake brine tail solution, from which the carbonate, sulfate, potash and borax values had largely been removed (see Example III infra for analysis of the liquor), was treated with about 40 ml./l. concentrated $H_2SO_4$ to lower the pH to 9.3. An agitation time of 15 minutes was required to complete the precipitation. The solution was filtered and thereafter an admixture of 1 M oxine and 1 M $H_2SO_4$ (15 ml./l.) was added to the filtrate. A total of 0.15 mole oxine for each 0.12 mole $WO_3$ was employed. The reaction was carried out at 20° C. The precipitate which formed constituted about 13 g./l., based on the dry weight of the solid, of which 4 g./l. was found to be tungsten-oxine precipitate. The remaining material consisted largely of the other salts precipitated on the addition of the sulfuric acid which was added with the oxine.

It was found that the volume of aqueous base and organic solvent required to dissolve the oxine and the tungsten was less than about 10% of the starting volume of the brine treated. Using the 1:10 ratio of aqueous base to original brine volume, .12 M base was sufficient since .12 M $NaWO_3Ox$ was present at this point, instead of the original .012 M tungsten material, which consumed .12 M OH in decomposing. The system was also somewhat buffered by the presence of salt impurities. Methyl isobutyl ketone was employed as the organic solvent. A solution of 1 M $H_2SO_4$ was used to strip the oxine from the organic solution which formed and more than 99% of the oxine was so recovered. A very small amount of oxine remained in the organic phase as what appeared to be a vanadium complex, giving the organic phase a greenish color. The tungsten oxide was recovered from the basic solution by acidifying the solution and precipitating the tungstic acid, which was then filtered. Five ml. of concentrated $H_2SO_4$/l. of treated brine was sufficient acid. With acidification using 24-hour digestion, only 53% recovery was achieved, so that it was necessary to use paper pulp and some cinchonine to bring down most of the remaining tungstic acid. Recovery was 81% $WO_3$ with the paper pulp alone and the cinchonine brought down most all remaining.

EXAMPLE II

Where the procedure of Example I was followed except that the tungsten-oxine precipitate formed was thereafter removed and treated differently, a recovery of 98.94% $WO_3$ was obtained. The precipitate aforementioned was washed with dilute (.1 M) acid to remove the salt impurities. This is necessary since, using the alternative procedure, the final tungsten-bearing solution is evaporated to dryness to yield the product. In the previously discussed process, washing was not necessary as the tungstic acid was precipitated from the tungsten-bearing solution, leaving the impurities in the supernate. The amount of acid used was small, 3–4 ml. of concentrated $H_2SO_4$ per liter of treated brine being sufficient. Following washing, a mixture of $NH_4OH$ and methyl isobutyl ketone solvent, the ammonium hydroxide being present in .15 M concentration, was added to the filter cake. The ratio of base to treated brine used was approximately 1:10, thus providing a slight excess of base. The oxine was stripped from the organic solvent in the fashion set forth in Example I, and the oxine recycled. The $WO_3$ was recovered from the ammonium hydroxide solution by evaporating to dryness and the remaining material was roasted at 1000° C. to yield 98.94% $WO_3$.

EXAMPLE III

In an additional test on a larger scale, a quantity of 50 gallons of a liquor derived from Searles Lake brine which had been carbonated with flue gas to precipitate sodium borates and sodium bicarbonate, which had a pH of about 9.7 and which was about 7.4 molal with respect to alkali metal ions, was charged into a 50 gallon temperature controlled vessel. The important constituents in the liquor were KCl—11.7 weight percent; $Na_2B_4O_7$—7.0 weight percent; $Na_2CO_3$—8.5 weight percent; $Na_2SO_4$—2.3 weight percent; $WO_3$—0.22 weight percent; and NaCl—7.6 weight percent. The compound 5,7-dichloro-8-hydroxy quinoline was added in a quantity of about 150% of stoichiometric, based on the $WO_3$ present in the solution, the reagent being added in the form of a paste formed from an admixture of the said reagent and G.E. "Antifoam 60"; the liquor was agitated as the reagent-antifoamant admixture was added thereto. The mixture was allowed to stand for a period of 2½ hours at a temperature of about 115° F. during which time a slurry formed. This was then filtered to yield a mass of finely divided particles forming a slimy, highly compressible cake. Filtration was conducted at about 120° F. In order to remove the co-precipitated inorganic salts from the cake, it was repulped with ⅛ M sulfuric acid and refiltered. A ratio of about 1 gallon per pound of wet crude cake was found sufficient; the pH of the repulped slurry was reduced to a value of about 2–4. The tungsten-dichloro-oxine complex formed was split utilizing a 35 gallon jacketed reactor for mixing and a 35 gallon insulated 80° conical-bottom tank as the settler. Ten gallons of ammonium hydroxide solution (4% NH₃ by weight) were charged to the reactor, after which the wet pulp cake containing a tungsten-dichloro-oxine complex was added and slurried into the ammonia solution. After the cake was completely dispersed, 19.5 gallons of technical grade chloroform were added to the reactor, and the mixture slowly heated to 120°–125° F. utilizing hot water so as to avoid boiling of the chloroform. The mixture was transferred to the insulated settling cone to allow the organic and aqueous phases to separate. Separation occurred rather rapidly into two layers, with the lower chloroform layer being dark green in color and the upper layer being a completely emulsified aqueous layer.

The emulsified aqueous ammoniacal layer was then purified; it was charged into a drum and treated with gaseous chlorine to oxidize all of the trivalent arsenic to the pentavalent state. The chlorine feed rate was adjusted such that bubbles just began to escape from the agitated liquor. This rate was later determined to be approximately 485 g. per minute. The chlorine was added at a rate of three pounds per pound of WO₃ in the ammoniacal liquor. The product was neutralized by the addition thereto of 28% NH₃ by weight, and then an additional 10% of concentrated ammonium hydroxide, based upon the volume of the chlorinated liquor, was mixed into the solution to render it strongly basic. A magnesium reagent consisting of 400 g. magnesium chloride hexahydrate and 300 g. NH₄Cl dissolved in 1500 ml. of warm water was then added in an amount of 30 ml. per liter of ammoniacal tungsten solution (based on the quantity of solution received directly from the splitting step). The entire mixture was chilled to 30° F. with agitation and held for 6 hours at this temperature. The precipitate was then filtered and the filter cake washed, using a 10 weight percent NH₃ solution. The resulting liquor was heated to concentrate it by a factor of 1.7 and the ammonia recovered. A glass-lined reactor was charged with an amount of concentrated sulfuric acid equal to 10% of the volume of the concentrated tungstate liquor. In addition, concentrated nitric acid equal to 10% of the volume of sulfuric acid was charged to the reactor to insure that the tungsten remained at its highest state of oxidation. The concentrated acid mixture was then heated to 270–277° F. and the concentrated tungstate solution dripped into the hot, agitated acid solution. Sufficient additional concentrated nitric acid was added to eliminate any green color. After all the tungstate solution had been added to the acid, the solution was boiled to remove a portion of the water from the tungstate-acid slurry. The product was then filtered at a temperature of 100–125° F. and the filter cake washed with dilute nitric acid (5% solution by weight). The acid-washed cake was dried overnight in a vacuum oven at approximately 70° C. under a vacuum of 15–20 inches Hg.

The process described above results in a tungstic acid containing impurities in the vicinity of 0.100% and thus affords means of obtaining a carbide-grade tungstic acid in a relatively high yield.

It is known that various impurities such as vanadium, iron, manganese, cobalt, copper, nickel, aluminum and magnesium are precipitated by oxine and the various other oxine materials listed earlier. See, for example, the Lilliendahl Patent 2,414,601. Hence, if such impurities are present in the solution from which it is desired to remove the tungsten, it is necessary that sufficient oxine be added to precipitate the impurities plus sufficient additional oxine material to precipitate the desired tungsten. Should such impurities be present, the process preferably is carried out in two separate stages wherein the impurities are first removed and the tungsten thereafter. Such impurities are not present in significant quantities in the Searles Lake brine discussed supra.

Obviously, many modifications and variaitons may be made without departing from the spirit and scope of this invention, and therefore only such limitations should be imposed as are indicated in the appended claims.

I claim:
1. A process for recovery of dissolved tungsten values from brine solution containing alkali metal ions comprising: adjusting the pH of the said solution to within the range of about 8–10; adding thereto a sufficient quantity of at least one reagent selected from the class consisting of oxine and halogen substituted oxines to bring the molar ratio of reagent to dissolved tungsten values to at least about 1:1, maintaining said alkali metal ion concentration in said brine solution at a value sufficient to form a tungsten-reagent precipitate; and thereafter adding a water-immiscible organic liquid which is a solvent for said reagent to said precipitate and contacting said precipitate with an aqueous phase having an alkaline pH such that said precipitate dissolves, contacting said organic liquid and said aqueous phase, whereby said reagent and said tungsten are separated.

2. The process of claim 1 wherein the solution to which the reagent is added is maintained at a temperature of 20–90° C. for a period of at least 15 minutes to allow for the precipitation of an oxine-tungsten complex.

3. The process of claim 1 wherein the reagent is halogen-substituted 8-quinolinol.

4. The process of claim 1 wherein the reagent is 8-quinolinol.

5. The process of claim 1 wherein the reagent is 5,7-dichloro-8-quinolinol.

6. The process of claim 1 wherein the reagent is 5,7-dibromo-8-quinolinol.

7. The process of claim 1 wherein the reagent is 7-iodo-8-quinolinol.

8. The process of claim 1 wherein the pH is adjusted to about 9.3.

9. The process of claim 1 wherein the brine solution is derived from a naturally-occurring mixture of salts.

10. A process for recovering dissolved tungsten values from brine solution containing alkali metal ions comprising: adjusting the pH of said solution to within the range 8–10, adding thereto a sufficient quantity of at least one reagent selected from the class consisting of oxine and halogen substituted oxines to bring the molar ratio of reagent to dissolved tungsten values to at least about 1:1, maintaining said alkali metal ion concentration in said brine solution at a value sufficient to form a tungsten reagent precipitate; treating said tungsten-oxine material with an aqueous phase having an alkaline pH such that said precipitate dissolves, contacting said aqueous phase with a water-immiscible organic liquid which is a solvent for said reagent to form an organic phase containing said reagent and an aqueous phase containing said tungsten; thereafter decreasing the pH of the said tungsten-bearing aqueous phase to form a tungstic acid; and recovering said tungstic acid.

11. The process of claim 10 wherein the reagent is a halogen-substituted 8-quinolinol.

12. The process of claim 10 wherein the reagent is 8-quinolinol.

13. The process of claim 10 wherein the reagent is 5,7-dichloro-8-quinolinol.

14. The process of claim 10 wherein the reagent is 5,7-dibromo-8-quinolinol.

15. The process of claim 10 wherein the reagent is 7-iodo-8-quinolinol.

References Cited in the file of this patent

UNITED STATES PATENTS

| | | |
|---|---|---|
| 2,414,601 | Lilliendahl | Jan. 21, 1947 |
| 2,801,152 | Kasey | July 30, 1957 |
| 2,962,349 | Anglin | Nov. 29, 1960 |
| 2,963,342 | Pilloton et al. | Dec. 6, 1960 |